US009076488B2

(12) United States Patent  (10) Patent No.: US 9,076,488 B2
Liebman  (45) Date of Patent: Jul. 7, 2015

(54) MEDIA FILE FOR MULTI-PLATFORM NON-LINEAR VIDEO EDITING SYSTEMS

(76) Inventor: Andrew Liebman, Brookline, MA (US)

( * ) Notice: Subject to any disclaimer, the term of this patent is extended or adjusted under 35 U.S.C. 154(b) by 228 days.

(21) Appl. No.: 12/937,859

(22) PCT Filed: Apr. 14, 2009

(86) PCT No.: PCT/US2009/040546
§ 371 (c)(1),
(2), (4) Date: Jan. 2, 2011

(87) PCT Pub. No.: WO2009/129252
PCT Pub. Date: Oct. 22, 2009

(65) Prior Publication Data
US 2011/0125818 A1    May 26, 2011

Related U.S. Application Data

(60) Provisional application No. 61/044,805, filed on Apr. 14, 2008.

(51) Int. Cl.
*G06F 17/30*    (2006.01)
*G11B 27/034*   (2006.01)
*G11B 27/32*    (2006.01)

(52) U.S. Cl.
CPC ........ *G11B 27/034* (2013.01); *G06F 17/30235* (2013.01); *G11B 27/329* (2013.01)

(58) Field of Classification Search
CPC ................ G11B 27/034; G11B 27/329; G06F 17/30235
USPC .................................................. 707/822, 828
See application file for complete search history.

(56) References Cited

U.S. PATENT DOCUMENTS

| 5,649,200 A | 7/1997 | Leblang et al. |
| 5,706,510 A | 1/1998 | Burgoon |

(Continued)

FOREIGN PATENT DOCUMENTS

| WO | WO 99/26170    | 5/1999 |
| WO | WO 2005/089446 | 9/2005 |

(Continued)

OTHER PUBLICATIONS

Lowry, "Hacker's Guide to QuickTime," 2004, http://home.sol.se/michael/qtguide/.*

(Continued)

*Primary Examiner* — James Trujillo
*Assistant Examiner* — Grace Park
(74) *Attorney, Agent, or Firm* — Sean D. Detweiler, Esq.; Morse, Barnes-Brown & Pendleton, P.C.

(57) ABSTRACT

A system and method for ingesting (capturing) digital video media files for storage on a Linux® platform-based computing environment that creates Quicktime Reference-compatible Files in the Linux® environment. Quicktime Reference-compatible Files are created such that they are labeled as not created by Avid's codec, but rather, by a native Quicktime codec. Then, via the system and method of the invention, at the time the Quicktime Reference-compatible Files are created in the Linux® environment, the system and method automatically captures the Avid file and automatically creates hard-links to those files so that the QuickTime Reference-compatible Files refer to the hard links rather than to the original Avid files. That is, rather than using the direct reference to the media files, a hard link is created to provide a second reference to them. In this manner, via said hard links (e.g., object reference), a user is permitted indirect access to all digital audio and video data that is stored in the directory on the storage device, while not requiring access to the original Avid media files. Advantageously, there is no need to convert Avid-formatted files to the Quicktime format.

14 Claims, 12 Drawing Sheets

(56) References Cited

U.S. PATENT DOCUMENTS

| | | | |
|---|---|---|---|
| 5,883,670 | A | 3/1999 | Sporer et al. |
| 6,044,374 | A | 3/2000 | Nesamoney et al. |
| 6,091,778 | A | 7/2000 | Sporer et al. |
| 6,167,083 | A | 12/2000 | Sporer et al. |
| 6,195,650 | B1 | 2/2001 | Gaither et al. |
| 6,230,185 | B1 | 5/2001 | Salas et al. |
| 6,301,105 | B2 | 10/2001 | Glorioso et al. |
| 6,321,219 | B1 | 11/2001 | Grainer et al. |
| 6,337,880 | B1 | 1/2002 | Cornog et al. |
| 6,389,433 | B1 | 5/2002 | Bolosky et al. |
| 6,457,021 | B1 | 9/2002 | Berkowitz et al. |
| 6,469,711 | B2 | 10/2002 | Foreman et al. |
| 6,584,152 | B2 | 6/2003 | Sporer |
| 6,628,303 | B1 | 9/2003 | Foreman et al. |
| 6,768,996 | B1 | 7/2004 | Steffens et al. |
| 6,996,588 | B2 | 2/2006 | Azagury et al. |
| 7,028,262 | B2 | 4/2006 | Estrada et al. |
| 7,069,594 | B1 | 6/2006 | Bolin |
| 7,124,366 | B2 | 10/2006 | Foreman et al. |
| 7,293,033 | B1 | 11/2007 | Tormasov et al. |
| 7,610,219 | B2 | 10/2009 | Sayed |
| 7,761,574 | B2 | 7/2010 | Liebman |
| 7,783,665 | B1 | 8/2010 | Tormasov et al. |
| 8,266,283 | B2 | 9/2012 | Liebman |
| 8,751,604 | B2 | 6/2014 | Liebman |
| 2001/0006453 | A1 | 7/2001 | Glorioso et al. |
| 2001/0014892 | A1 | 8/2001 | Gaither et al. |
| 2001/0024472 | A1 | 9/2001 | Sporer et al. |
| 2001/0040592 | A1 | 11/2001 | Foreman et al. |
| 2001/0051955 | A1 | 12/2001 | Wong |
| 2002/0073144 | A1 | 6/2002 | Katoh et al. |
| 2002/0138843 | A1 | 9/2002 | Samaan et al. |
| 2002/0149618 | A1 | 10/2002 | Estrada et al. |
| 2002/0165856 | A1 | 11/2002 | Gilfillan et al. |
| 2003/0095789 | A1 | 5/2003 | Wakimoto et al. |
| 2003/0097276 | A1 | 5/2003 | Kirkland |
| 2004/0002990 | A1 | 1/2004 | Sander et al. |
| 2004/0049520 | A1 | 3/2004 | Bowers et al. |
| 2004/0056882 | A1 | 3/2004 | Foreman et al. |
| 2004/0066395 | A1 | 4/2004 | Foreman et al. |
| 2004/0071441 | A1 | 4/2004 | Foreman et al. |
| 2004/0088313 | A1 | 5/2004 | Torres |
| 2004/0199578 | A1 | 10/2004 | Kapczynski et al. |
| 2005/0086296 | A1 | 4/2005 | Chi et al. |
| 2005/0091289 | A1 | 4/2005 | Shappell et al. |
| 2006/0026213 | A1 | 2/2006 | Yaskin et al. |
| 2006/0053442 | A1 | 3/2006 | Ridderheim et al. |
| 2006/0092178 | A1 | 5/2006 | Tanguay et al. |
| 2006/0098941 | A1 | 5/2006 | Abe et al. |
| 2006/0184673 | A1 | 8/2006 | Liebman |
| 2007/0011304 | A1 | 1/2007 | Error |
| 2007/0022215 | A1 * | 1/2007 | Singer et al. .................. 709/246 |
| 2007/0078768 | A1 | 4/2007 | Dawson |
| 2007/0094328 | A1 | 4/2007 | Birch |
| 2007/0094601 | A1 | 4/2007 | Greenberg et al. |
| 2008/0112683 | A1 | 5/2008 | Lin et al. |
| 2008/0256242 | A1 | 10/2008 | Liebman |
| 2009/0037520 | A1 | 2/2009 | Loffredo |
| 2010/0281372 | A1 | 11/2010 | Lyons et al. |
| 2011/0026898 | A1 | 2/2011 | Lussier et al. |
| 2011/0167036 | A1 | 7/2011 | Liebman |

FOREIGN PATENT DOCUMENTS

| | | |
|---|---|---|
| WO | WO 2007/082171 | 7/2007 |
| WO | WO 2009/129252 | 10/2009 |
| WO | WO 2009/155578 | 12/2009 |

OTHER PUBLICATIONS

Björn Adamski, "MXF-Erweiterung für QuickTime," FKT Fernseh Und Kinotechnik, Fachverlag Schiele & Schon GMBH., Berlin, DE, 62(4): 2008.

Supplementary European Search Report for European Application No. 09731871.1, mailed Nov. 10, 2011.

Notice of Allowance for U.S. Appl. No. 11/403,036, dated Apr. 23, 2012.

Non-Final Office Action for U.S. Appl. No. 12/999,964, dated Mar. 29, 2012.

International Search Report for International Application PCT/US2009/040546, dated Feb. 1, 2010.

International Search Report for International Application PCT/US2009/048056, dated Nov. 25, 2009.

Final Office Action for U.S. Appl. No. 12/999,964, dated Oct. 22, 2012.

Non-Final Office Action for U.S. Appl. No. 12/999,964, dated Jun. 18, 2013.

Non- Final Office Action for U.S. Appl. No. 13/584,149, dated Sep. 12, 2013.

Notice of Allowance for U.S. Appl. No. 13/584,149, dated Jan. 30, 2014.

Non- Final Office Action for U.S. Appl. No. 12/999,964, dated Sep. 10, 2014.

Supplementary European Search Report for European Application No. 12767666.6, mailed Nov. 4, 2014.

Final Office Action for U.S. Appl. No. 12/999,964, dated Feb. 23, 2015.

* cited by examiner

Fig. 9B

| Owner | Group | Link |
|---|---|---|
| editshare | univapril12 | |
| editshare | univapril12 | |
| andy | univapril12 | |
| andy | univapril12 | |
| andy | univapril12 | |
| andy | univapril12 | |
| andy | univapril12 | |
| andy | univapril12 | |
| brian | univapril12 | /RAIDS/RAID_1/Universal/UnivApril12_: |
| editshare | univapril12 | |
| editshare | univapril12 | ./QuickTime |
| editshare | univapril12 | |
| andy | univapril12 | |
| andy | univapril12 | |
| andy | univapril12 | |
| editshare | univapril12 | |
| editshare | univapril12 | |
| editshare | univapril12 | |
| editshare | univapril12 | |
| brian | univapril12 | |
| brian | univapril12 | |
| andy | univapril12 | /RAIDS/RAID_1/Universal/UnivApril12_: |
| editshare | univapril12 | |
| editshare | univapril12 | ./QuickTime |
| editshare | univapril12 | |
| editshare | univapril12 | |

MEDIA FILE FOR MULTI-PLATFORM NON-LINEAR VIDEO EDITING SYSTEMS

CROSS-REFERENCE TO RELATED APPLICATIONS

This application is a national stage filing under 35 U.S.C. 371 of International Application No. PCT/US2009/040546, filed Apr. 14, 2009, which claims the benefit of and priority to U.S. Provisional Application No. 61/044,805, filed on Apr. 14, 2008. The entire contents of PCT Application No. PCT/US2009/040546 is incorporated by reference herein. International Application PCT/US2009/040546 was published under PCT Article 21(2) in English. This application is related to U.S. patent application Ser. No. 11/403,036 filed on Apr. 12, 2006, which is a continuation-in-part of co-pending PCT Patent Application No, PCT/US05/08968 filed Mar. 18, 2005 and entitled Novel Media File Access and Storage Solution For Multi-Workstation/Multi-Platform Non-Linear Video Editing Systems which claims the priority in U.S. Provisional Patent Application Ser. No. 60/554,272, filed Mar. 18, 2004 and entitled MEDIA FILE ACCESS AND STORAGE SOLUTION FOR MULTI-WORKSTATION/MULTI-PLATFORM NON-LINEAR VIDEO EDITING SYSTEMS. The whole contents and disclosure of U.S. patent application Ser. No. 11/403,036 is incorporated by reference as if fully set forth herein.

BACKGROUND OF THE INVENTION

1. Field of the Invention

The present invention generally relates to media files and, more particularly, a universal digital video media file format.

2. Description of the Prior Art

Non-linear video and audio editing systems (NLE's) that can perform random access on the source material are typically set up on independent computer workstations having a means to input digital or analog audio and video as well as software for editing the inputted audio and video.

In the world of non-linear digital video editing, one of the constant problems faced by production facilities that employ a mixture of video editing products from competing vendors (such as Avid, Apple, Sony, Thomson-Grass Valley, and Adobe) is the fact that many video editing applications use proprietary and incompatible file formats. For instance, the two most popular video editing applications today—Avid and Final Cut Pro—the former captures or imports video files into the "omf" or "mxf" format, while the latter captures video in the Quicktime format. Neither application can natively play or manipulate the files created by the other.

Additionally, different vendors often have their own proprietary video CODECS (compression/decompression algorithms) that can reduce the size of video files so that they occupy less space and still maintain a usable quality.

It is somewhat helpful that there are certain standardized or publicly available CODECS that are supported by all vendors of digital video editing applications. Examples of such CODECS include, but are not limited to, "DV-25" (25 megabit Standard Definition Digital Video), "DV-50 (50 megabit Standard Definition Digital Video), "DV-100 (100 megabit High Definition Digital Video), and Sony's IMX formats (variants of MPEG-2).

However, despite the fact that competing vendors almost always support these standardized CODECS, one of the leading vendors of NLE applications—Avid—adds a proprietary wrapper to these standardized codecs when capturing files in those formats, and may split audio off into discreet files when it was originally embedded in a single data stream with the video. Avid essentially alters the presentation of standardized digital data, effectively making the format of the file as it is stored on disk incompatible with other competing applications. There may be other vendors who do similar things, although most vendors seem to allow video that's encoded in standardized formats to be stored in standardized ways that are compatible across most all applications.

To illustrate, if a TV station captures files in Avid's DV-50 format, after setting aside approximately 8 MB of space per second of video to store a file, other competing applications such as Apple's Final Cut Pro or Adobe Premiere or many third-party indexing and database tools cannot utilize the same file even though the essence of the digital data is something they support. Typically, if a video clip will be manipulated by Avid as well as other applications, duplicate video data must be captured multiple times and stored in multiple formats so that it can be used by the competing applications.

In order to avoid the inconvenience of having to capture or transcode and store multiple versions of the same video and audio data so that it could be used by Avid and other competing non-linear video editing applications, it would be desirable to have a system that permits a single set of video and audio files to be used by all applications and that enables this functionality automatically.

A current prior art solution include Apple's "Quicktime Reference File" built into its Quicktime format. A Quicktime Reference file is a small file (typically about 1 to 2 kilobytes) that can refer to non-Quicktime media files and make those media files appear as Quicktime files to applications that are able to read Quicktime files. So, for instance, Quicktime reference files can be created on a Windows or Macintosh OS computer such that Avid's "mxf" or "omf" files appear to be valid "Quicktime Files".

Generally, Quicktime Reference Files are files having links to that audio and video media files that are NOT in the Quicktime format and that make those files appear to be in the Quicktime Format so that they can be played by any Quicktime-compliant applications.

All current Avid NLE applications include the ability to make Quicktime Reference Files. Even though Avid stores all its files in a proprietary formats, Avid provides a limited feature that allows clips or edited movies to be viewed via Windows or Mac-based Quicktime-compliant video application (such as another NLE or an encoding program)—provided that the freely distributable Avid CODECS are installed on the computer that will play the Quicktime Reference File, and provided that the computer has the Avid media files mounted. So Quicktime Reference Files are well known in the video editing and post production world.

However, there are some clear deficiencies in the way Avid and others create Quicktime Reference files such that the resulting Quicktime Reference Files are especially difficult to use in video editing applications.

First, while most professional video applications provide a means to embed the "source name" and "source timecode" in the metadata associated with captured video clips—which is crucial for many steps of the production process (e.g., re-capturing, archiving, "conforming" at high resolution a video originally edited at "draft resolution") Avid's process of creating Quicktime reference files does not put the "source name" and "actual source timecode" in the reference file. Thus, when you open an Avid-produced Quicktime Reference File in Final Cut Pro, for instance, the starting timecode is always 00:00:00:00 for every clip, and there is no indication of what the original source was for the material. It is possible to put correct and accurate information source name and timecode in the Quicktime Reference File. Avid just chooses not to do it.

Another deficiency occurs in the "codec" information that gets put into the Quicktime Reference File. In specific, even though an original clip might have been captured in the "Avid DV25" format, if the Quicktime Reference File refers to the clip as being encoded in the "Avid DV25" codec (Avid's proprietary way of wrapping standardized DV25 files) instead of just standard "DV25", then the application trying to play the Quicktime Reference File will decode the file using Avid's codec rather than the standardized codec. When not used from within Avid applications, Avid's codecs perform very poorly—typically video cannot be played in real time without stuttering, or playing video in real time causes excessive CPU utilization. Simply modifying the Quicktime Reference File to say the clip is encoded with the standard "DV25" codec instead of "Avid DV25" would allow the file to play back perfectly in a non-Avid NLE application. Yet, many programs that produce Quicktime Reference Files label data as being in the Avid proprietary format rather than being in the standardized format. The situation is identical for not only DV25 but also DV50 and DV100 (also known as DVC Pro HD).

A third deficiency is that most procedures to produce Quicktime Reference Files from Avid media clips are inconvenient and require many steps. Cumbersome procedures clearly deter many production facilities from using Quicktime Reference Files.

A fourth deficiency especially affects collaborative work environments that have central storage. Because Quicktime Reference Files typically refer to files that are by Avid users and not by the Quicktime Reference File users, there is a danger that the Quicktime Reference Files could become useless should the original files to which they refer get deleted by accident or should the original files get deleted deliberately by Avid editors who are finished using the original files and who are unaware that someone is still using them via Quicktime Reference Files.

A fifth deficiency is that until now, there has been no way to produce Quicktime Reference Files on the Linux® platform, in part because the inventor of Quicktime (Apple) does not have or has not distributed a toolkit that can create Quicktime Reference files on Linux®. Therefore, for a Linux-based storage system, currently the only way to make Quicktime® Reference Files on the system is via a Windows or Mac-based application that is connected to the Linux-based central storage.

It would be highly desirable to provide a system and method for correcting these deficiencies by allowing a single set of video and audio files to be used by all non-linear video editing applications automatically.

SUMMARY OF THE INVENTION

The present invention is directed to improvements for video and audio non-linear editing systems and other devices (e.g., encoders and hardware or software that can record, playback, and/or access digital media files over a network), and, a method and computer program product that enables certain video file formats to be played via devices operating under control of a Linux-based operating system, in addition to Windows and the Mac OS platforms.

The invention includes an "Ingest Application" developed to run on Linux, Windows and the Mac OS platforms. The "Ingest Application", in one-embodiment, allows DV25, DV50 and DV100 video and audio to be captured on devices via Firewire high-speed communications communications link (i.e., IEEE 1394 interface). According to the ingest application, the video and audio media files captured can be saved in Avid's proprietary codecs, as well as in standards-based Windows AVI and Apple Quicktime formats. The Ingest Application also allows those three DV formats as well as many others to be captured via digital or analog video signals that come into the computer via an optional "capture card" that can include SDI, HD-SDI and other digital and analog inputs.

Alternately referred to as a "Universal Media File", the invention includes an add-on to the novel Ingest Application for the Linux® platform (Linux is a registered trademark of Linus Torvald). However, the "Universal File" could be applied as an add on to other competing Ingest/Capture Applications, and be used to process files that were captured by NLE applications themselves and stored on a central server, or to "post-process" files that were previously captured by the Ingest Application and stored on a server.

The novel Ingest Application for the Linux® platform is part of a general "toolkit" application that includes additional functionality for creating Quicktime Reference Files in the Linux® environment. The invention is generic enough that if the server being used were running Windows, it will create the Quick Time Reference Files in Windows. The difference being in that situation is that use could be made of Apple's existing toolkit for Windows and modifying the results. However, in Windows, some of the protections may not be able to be achieved as in the Linux-based implementation of the invention. For example, it's not really possible to create Hard Links in Windows.

Thus, in accordance with the invention, there is provided a system and method for ingesting (capturing) digital video media files for storage on a Linux® platform-based computing environment that creates Quicktime Reference-compatible Files in the Linux® environment. Quicktime Reference-compatible Files are created such that they are labeled as not created by Avid's codec, but rather, by a native Quicktime codec. Then, via the system and method of the invention, at the time the Quicktime Reference-compatible Files are created in the Linux® environment, the system and method automatically captures the Avid file and automatically creates hard-links to those files so that the QuickTime Reference-compatible Files refer to the hard links rather than to the original Avid files. That is, rather than using the direct reference to the media files, a hard link is created to provide a second reference to them. In this manner, via said hard links (e.g., object reference), a user is permitted indirect access to all digital audio and video data that is stored in the directory on the storage device, while not requiring access to the original Avid media files. Advantageously, there is no need to convert Avid-formatted files to the Quicktime format.

In an alternate embodiment, the scheme for simultaneously capturing Avid files includes creating a hard-link to that captured file in a media space that could be accessed by all applications (e.g., FinalCutPro or other Quicktime applications). Thus, advantageously, these files and non-AVID applications do not necessarily have to cut into AVID's media (file) space. Thus, in this alternate embodiment, users refer to links (hardlinks) to the original files (for both AVID an non-Avid application users) and will be placed into a common directory.

Further, it is possible to provide user-access to the QuickTime Reference files by defining a network share that only sees the QuickTime Reference directory and its subdirectories (thereby excluding seeing the Avid media files directory structure. Alternatively, it is possible to include access to the QuickTime Reference files alongside the Avid directory structure—so that a user can see both the QuickTime Reference Files and the Avid directory structure.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

A Quicktime Reference file may refer to a single file, to a set of audio and video files that are meant to be played simultaneously, or to a long list of audio and video files that make up a sequence. That is, the QuickTime file format functions as a multimedia container file or wrapper that contains or wraps one or more tracks, each of which stores a particular type of data: audio, video, timecode, etc. Tracks are maintained in a hierarchal data structure consisting of objects called atoms. Each track either contains a digitally-encoded media stream (using a specific codec) or, in the case of a QuickTime Reference movie, the tracks mostly refer to media streams located in one or more other files. With the Quicktime Reference concept, it is possible to create a single small file that refers to all of the thousands of individual audio and video clips that are part of an entire movie and fold all the references up into one file such that when you play the "Reference File" you locate and call up all the bits and pieces of the movie such that the movie plays as a coherent whole.

For illustrative and non-limiting purposes, it is assumed Quicktime Reference files are implemented that refer to the audio and video portions of individual clips. The system enables the following:

The ingesting and capture DV25, DV50 and DV100 video and audio clips and the saving of the digital media files in a proprietary Avid® codec and to simultaneously and automatically create a Quicktime Reference-compatible File on a Linux-based storage device such that a single set of digital media files (those in the proprietary Avid codec) will also appear as Quicktime files and can be played by non-Avid applications.

Fundamental is the ability to natively produce Quicktime Reference files in Linux including: creating for operation in Linux supported application, a Quicktime Reference File that is indistinguishable from a Quicktime Reference file produced by Apple's own Mac and Windows Quicktime tools. It accomplishes this by automatically searching and looking at the location of the digital media files stored in the proprietary Avid® codecs and embed that location in the Quicktime Reference compatible file; and by searching and looking at the "source name" and "time code" information from the digital media files stored in the proprietary Avid® codecs and embed that information in the Quicktime Reference-compatible Files.

Figure 4:
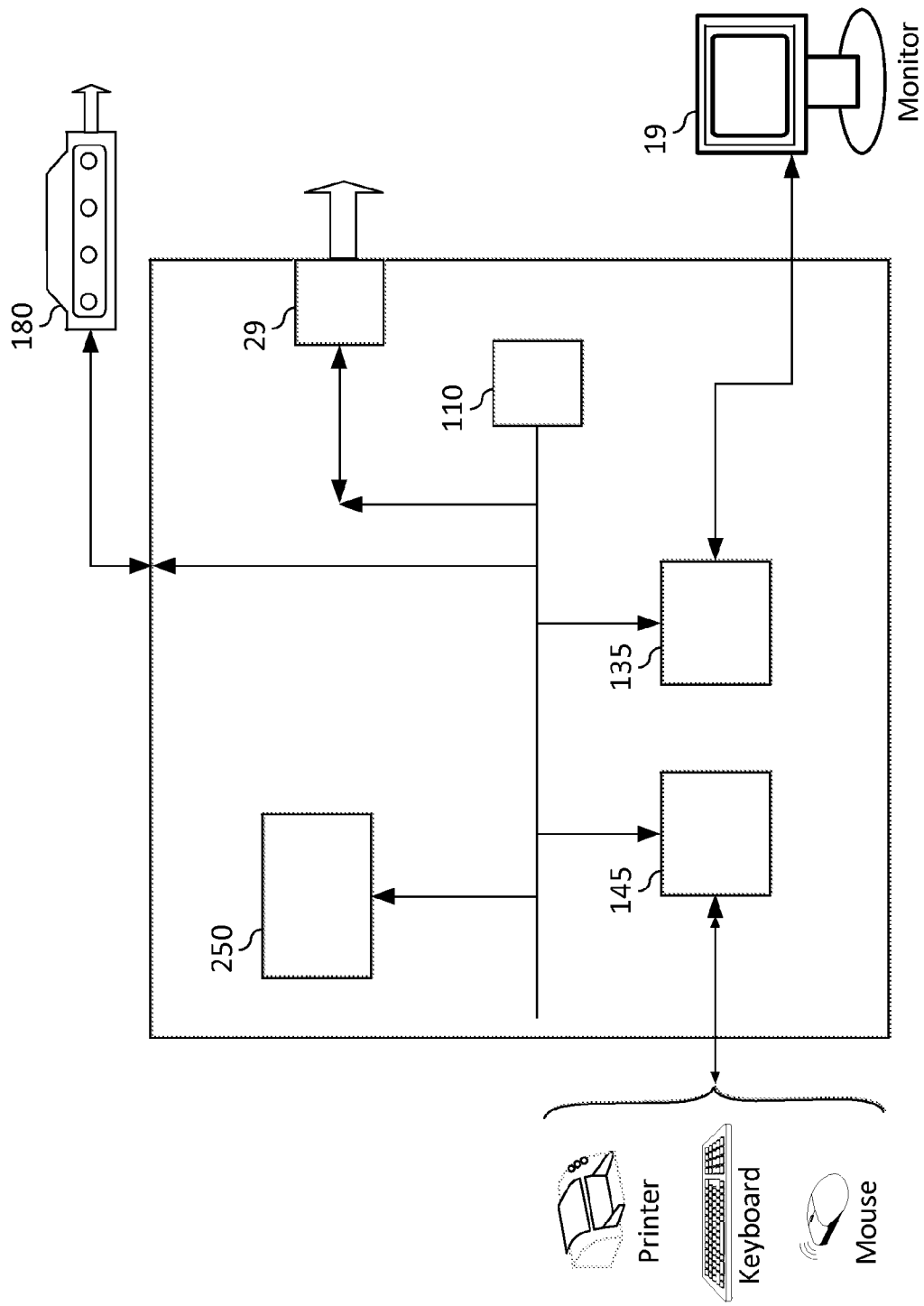
FIG. 4 depicts the configuration of a typical non-linear video editing (NLE) system workstation in communication with the server device of FIG. 3.

Fundamental to the invention is providing the ability to natively produce Quicktime Reference files on any general purpose computing device, and most favorably in Linux-based computing platforms. The technology executes, by a computing processor or like computer unit such as shown in FIG. 4, software instructions that enables users to: Open up Avid MXF files, extract the relevant metadata from the files about source tape and timecode, and write that relevant metadata into the resulting QuickTime Reference Movie files that are created. Avid MXF files are created with a "Flow Ingest" server, but the software could also process files made by Avid's own ingest software or hardware to create QuickTime Reference Movies from Avid's own MXF files.

Thus, in one embodiment, the system and method of the invention involves:

1. Creating in Linux a Quicktime Reference File that that is indistinguishable from a Quicktime Reference file produced by Apple's own Mac and Windows Quicktime tools;

2. Looking at the location of the digital media files stored in the proprietary Avid® codecs and embedding that location information in the newly created Quicktime Reference file. As Avid is the only Non-Linear video editing software company that uses Avid codecs, Avid makes these codecs publically available for decoding purposes. The decoding-only versions are not optimized to work in real time, and thus are not suitable for real time editing. The MXF wrapper that wraps or contains modern-day encoded Avid files are well described and adhere to a specific SMPTE (Society of Motion Picture and Television Engineers) standard called "OP Atom" (www.smpte.org/standards) that Avid proposed. In the case of Avid's DV25, DV50, and DVC Pro HD—otherwise know as DV 100—codecs, the codec itself is not proprietary. These are open published standards. Thus, the invention makes available a single set of "essence data" to be present as an Avid OP Atom file and also as a QuickTime file without having to duplicate the "essence data";

3. Looking at the "source name" and "time code" information from the digital media files stored in the proprietary Avid® codecs and embedding that information in the newly created Quicktime Reference Files. Again, the metadata is locatable as the MXF OP Atom format specifies how to encode metadata and where to put it. For example, the MXF format permits various types of metadata at various places in the file (typically the beginning or ending). Moreover, types of metadata can include information such as: the "clip name", "reel name", "timecode start" and must also include information about what codec has been used to encode the video and audio tracks; furthermore, the metadata must also include information about where the audio and video data begin in the file (an offset value) from some known point of reference.

Thus, taken together, the information that is put into a QuickTime Reference Movie is extracted from an MXF file so that when QuickTime follows the references, it finds the beginning of the essence or data portions of the MXF files. Thus, for instance, in an example application, it is known that a video track begins 1400 bytes from the start of the MXF video file, and that each audio's essence begins 600 bytes from the beginning of the MXF audio files. This same information is placed into the QuickTime file—the difference being the "offset" for where the essence begins isn't from the beginning of the QuickTime file but from the beginning of other files.

It should be understood that the slots for metadata are pretty strictly defined for MXF files. MXF files use a hierarchical tree much like QuickTime files. There are slots for information about timecode, reel name, clip name, etc. Information about where the "essence" (i.e., video and audio data) is located in the file is put into an "offset table" that is located at the end of the file. Thus, QuickTime will know how far into the file to look to find the video data by extracting the offset information from the offset table at end of the file. Moreover, the OP Atom files created for (and by) Avid have separate video and audio files—therefore QuickTime must be given the name and location of each of those files, and an "offset" for where the video or audio data begins in each of those files. The size of the offset in MXF files includes possible options such as: 0x40000, 0x60000 or 0x80000 bytes. Those skilled artisans who work with MXF files can read the metadata out of such files, and inspect the files to see what the offset is to know where the video and/or audio essence begins.

Figure 1:
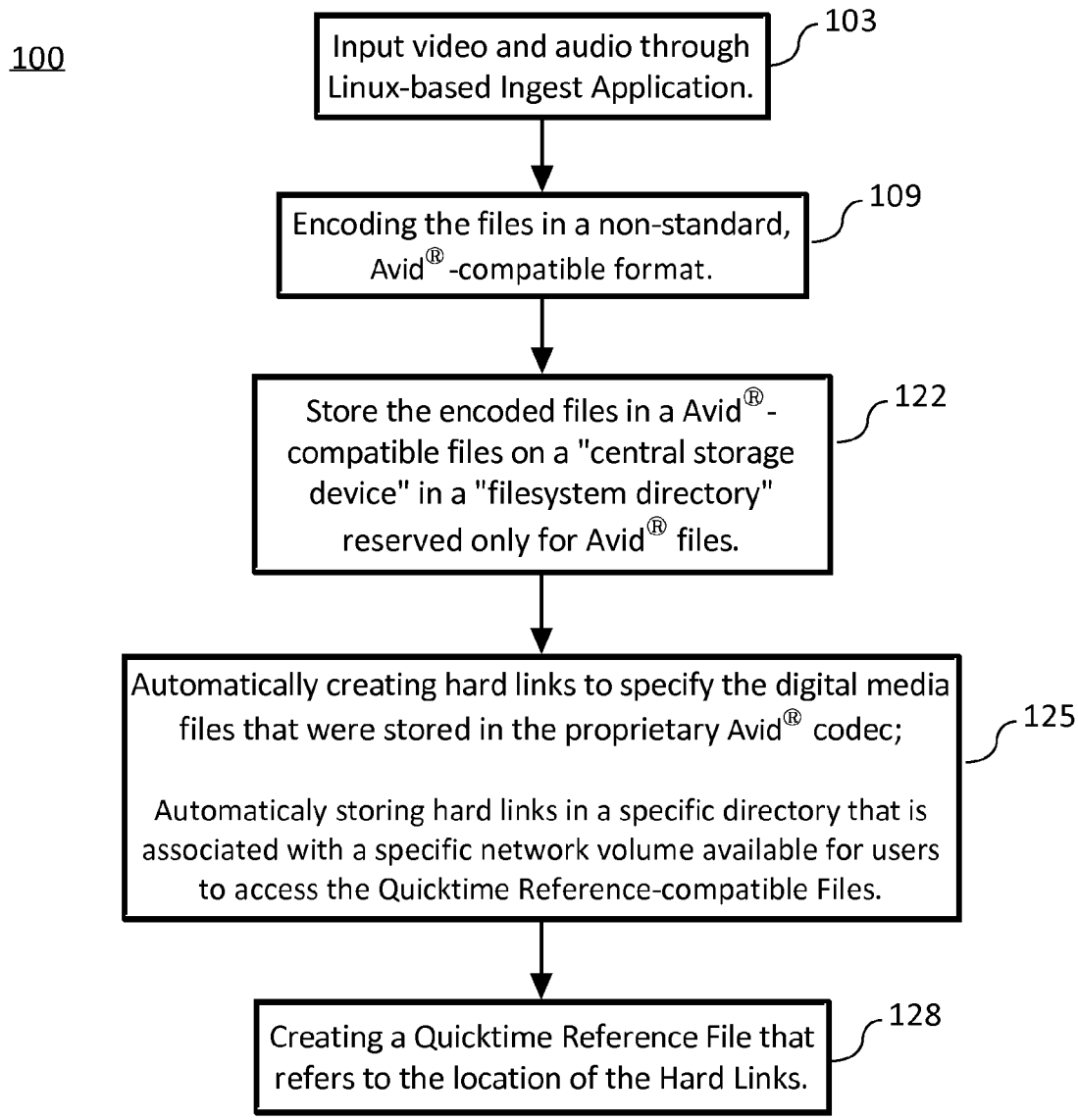
FIG. 1 depicts an example flow chart discussing method steps of the invention.

As shown in FIG. 1, a step-by-step process 100 of how the invention works is now explained. At a first step 103, digital or analog video and audio streams are received or provided at a computing device such as shown in FIG. 4, and are input through the Ingest Application (alternatively referred to herein as "Flow Ingester") executing on the Linux machine. Then, at step 109, in one embodiment, the Ingest Application encodes the Avid® compatible digital video and audio streams into using standardized codecs as does Avid®. Alternately, the digital or analog video and audio streams may be ingested by some other party's application. In either embodiment, the media files are wrapped in a Avid-compatible format. Then, at step 122, the Avid®-compatible files are then stored on a "central storage device" in a filesystem directory that is reserved only for Avid® files.

When it is desired to make the same digital files accessible to non-Avid users via Quicktime Reference Files, as shown at step 125, FIG. 1, in a separate directory on the same filesystem, a "hard link" is created to each of those digital media files that were stored in the proprietary Avid® codecs. The hard links are then stored in a specific directory that is associated with a specific network volume that will be available for users to access the Quicktime Reference Files.

Then, as shown at step 128, Quicktime Reference Files are created that refer to the location of the Hard Links rather than to the location of the original Avid files.

Figure 2:
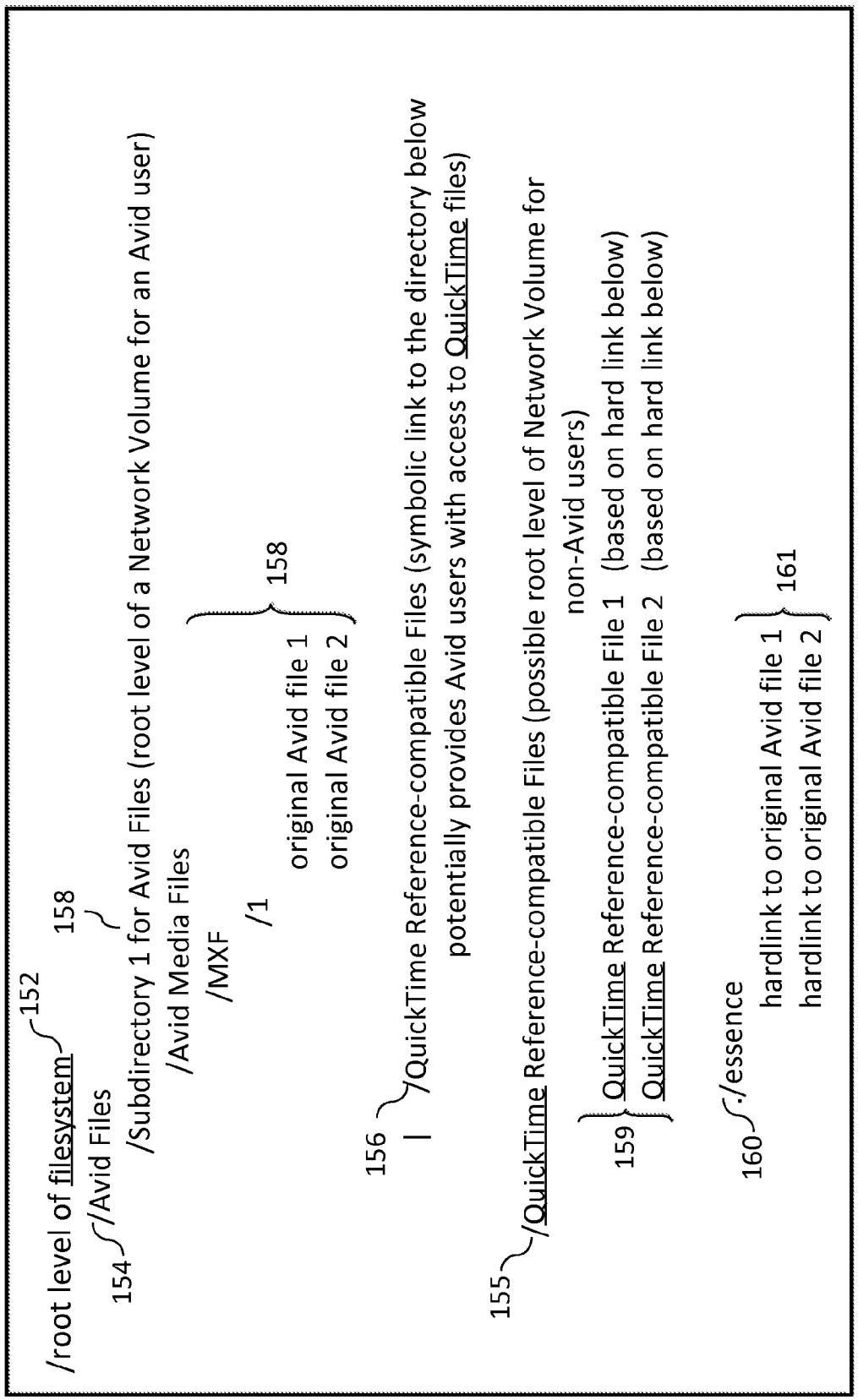
FIG. 2 depicts an example directory structure resulting from operations steps of the functionality depicted in FIG. 1.
Figure 3:
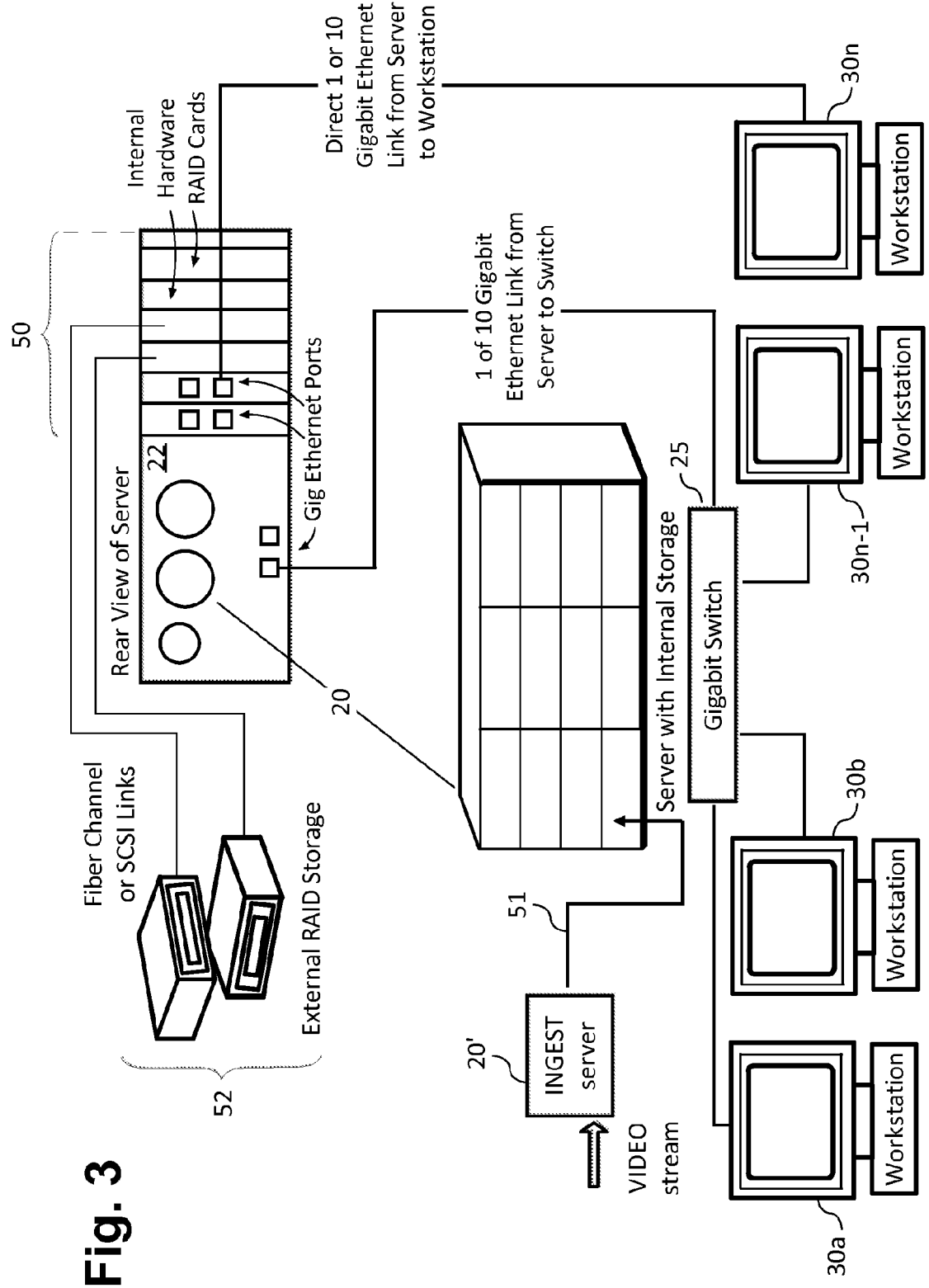
FIG. 3 depicts an architecture and exemplary computer environment for implementing the server-side ingest and file storage features according to one embodiment of the invention.

FIG. 2 depicts a simplified view of how this appears in a directory structure layout 150 of the computing and memory storage system shown in FIG. 3, for example. Typically, beneath a system level root directory 152, the storage server software creates a subdirectory 154 for storing native Avid files. On the same filesystem, the method of the invention creates a further sub-directory folder QuickTime Reference-compatible Files 155. In the created Avid Files sub-directory folder 154, a further "Sub-directory 1 for Avid files" 158 is created, which is the highest level directory to which an Avid user has direct access, and to where original Avid-compatible digital media files are located, e.g., "original avid file1" and "original avid file2". In the QuickTime Reference-compatible Files sub-directory directory 155, a further ".essence" sub-directory 160 is created for storing the automatically created hard links 161 (object references) to the original AVID compatible files located, i.e., the .essence sub-directory includes hard links to "original avid file1" and to "original avid file2". QuickTime Reference-compatible Files 159 are stored immediately above the .essence sub-directory 160, and point to the hard links 161 in the .essence sub-directory 160 which in turn point to "original avid file1" and "original avid file2". The sub-directory Quicktime Reference Compatible Files 155 could be one possible root level of a Network Volume for non-Avid users and would provide access to only the QuickTime Reference-compatible files and hard links. Alternatively, a non-Avid user could access QuickTime Reference files via the directory symlink QuickTime Reference-compatible Files 156 located inside Subdirectory 1 for Avid Files 158, if it were desirable to allow non-Avid users to see the Avid directory structure in addition to seeing the QuickTime Reference files.

Furthermore, in accordance with the present invention, there is provided a novel GUI for enabling the functionality for providing Quicktime Reference-compatible Files, however, with the present invention, the process of creating hard links and Quicktime Reference Files is completely automatic. A user simply indicates, via the "Ingest Application" that he/she wants to create files that are accessible by both Avid and non-Avid applications, i.e., a Universal Media File. Upon indicating "yes", both Avid-Compatible files as well as Quicktime-compatible (i.e., "hard link/Quicktime Reference" combination files) are produced. A more detailed description about the novel GUI is provided herein below.

Hard links (one or more valid names given to a single piece of data) to files are generated rather than referring to the original Avid-Compatible files as hard links solve the problem of "files that are referred to by Quicktime Reference Files inadvertently getting deleted". On the Linux® platform and, on other Unix-like operating systems, a "hard link" is essentially an additional "name" for a given file. Unlike "soft links" or "symbolic links", which are files themselves and which redirect access to the location of the original file, hard links are additional directory listings for the same file. Deleting the original file will not affect the hard link. Even after deleting the original file, opening the hard link will still bring you to the data. Once a hard link has been created, both the hard link and the original file must be deleted before the data will disappear. On the other hand, symbolic links may not protect a non-Avid user from an Avid user inadvertently deleting the Avid-compatible file. If symbolic links were to be used instead of hard links, the system would become vulnerable as if the Quicktime Reference Files were created based on the location of the original Avid-compatible files.

In one example embodiment, a new directory space may thus be made for locating all Quicktime Reference files that is viewable to all user's directly from their workstations, with hardlinks located in a folder, e.g., called "essence". The things being referred to by the reference files are in a fixed relationship. That is, two folders co-exist in the same directory; i.e., one having the Quicktime Reference-compatible files; and, one having the files that the reference files are referring to (See FIG. 2).

Referring now to drawings, and particularly to FIGS. 3 and 4, there is shown an example computing environment in which the present invention may be implemented.

As shown in FIG. 3, the overall computing environment in which the present invention may be implemented includes a server device 20 connecting multiple video-editing client workstations 30a, 30b, . . . , 30n via a high speed network connection (e.g., Gigabit Ethernet or 10 Gigabit Ethernet). The media data can flow between the server 20 and the workstations via a switch device 25, through a direct Ethernet connection or other connection between server and workstation, or through a wireless connection. The server device 20 preferably includes one or more processor devices, e.g., an Intel Pentium4 or Xeon or an AMD Opteron, supporting processor speeds in excess of 2.4 GHz in the case of the Pentium4 and Xeon, 1.8 Ghz in the case of the Opteron. Furthermore, the server device 20 preferably includes 1 Gigabyte or more of RAM. In addition, the server 20 includes at least one high speed Ethernet port (preferably 1 Gigabit or higher). The server 20 also includes a means for storing digital media files and other data and preferably providing Terabytes of storage capacity, for example, a data storage subsystem 50 consisting of hardware RAID cards which are attached both to 32-bit PCI or 64-bit PCI/PCI-X/PCI-Express slots on the motherboard and to high-capacity internal hard drives (e.g., Serial ATA drives), and/or a data storage subsystem 52 consisting of external RAID arrays which are connected to Fibre Channel or SCSI Adapters which are also attached to 32-bit PCI or 64 bit PCI/PCI-X or PCI-Express slots on the server motherboard. More particularly, the data storage subsystem 50 may comprise storage media including, but not limited to, magnetic hard disk, optical storage drives, and even solid state disk and memory cards, etc. As would be known to skilled artisans, the hardware architecture may alternately comprise media access control devices configured to support IDE, SCSI, SAS, Fibre Channel, Firewire, and USB devices, protocols and topologies. Regardless of the storage media controller contemplated (e.g., SATA, SAS, IDE, or SCSI) it will control multiple storage media drives 52 configured in and/or connected to the server.

For purposes of discussion, in one embodiment, the centralized shared storage systems for collaborative non-linear editing and manipulation of digital video and audio files is configured with two 3ware (a unit of AMCC, San Diego, Calif.) 9000S-8 Hardware RAID cards each attached to eight 250 GB SATA hard drives. The server and its storage subsystem are connected to an Ethernet network. The switch device 25 enabling communications with each workstation 30a, 30b, . . . , 30n may comprise a Gigabit Workgroup Switch such as provided by SMC Networks® (Irvine, Calif.), enabling workstations to function at full Gigabit speeds with a Gigabit Ethernet adapter 29 having integrated Gigabit Ethernet MAC and PHY layer functions.

The server 20 with its storage subsystem 50, 52 and connections to an Ethernet network, preferably, run the Linux operating system (or, equivalently running a Unix or like Unix variant operating system—including Apple's OS X—which can run the software and hardware as described hereinbelow). The switch device 25 enabling server communications with each workstation 30a, 30b, . . . , 30n may comprise a Gigabit network switch device such as provided by SMC® (Irvine, Calif.) that supports "Gigabit over Copper" Ethernet as well as "Jumbo Frames" (defined by a packet size or Maximum Transmission Unit—MTU—of 9000). This enables workstations 30a, 30b, . . . , 30n to function at full Gigabit speeds over Ethernet cables 60 that allow for maximum data throughput over the network and minimum use of CPU resources both by the server and workstations in order to support network transactions. It is assumed that the server device 20 includes at least two Gigabit Ethernet network adapters 22 having integrated Gigabit Ethernet MAC and PHY layer functions. Such a system—along with the storage subsystem diagramed—allows for sufficient data transfer between the server and workstations to support at least 10 NLE workstations or other capable hardware such as, but not limited to, encoders, playout servers, and video recorders that play from and record to devices such as hard drives simultaneously accessing media files on the storage subsystem.

In one embodiment of the invention, an additional server device 20' is configured as anIngest Server computer including a video capture device that runs on a Linux-based high-end dual Quad-core Xeon (or similarly-powered) computer. Ingest Server accepts standard digital and analog video and audio inputs (SDI, HD-SDI, component, composite, embedded audio, AES/EBU audio, etc) and encodes raw video and audio data streams into various codecs.

In an additional configuration shown in FIG. 3, one of the configurations of the Ingest Server 20' is that it captures directly to a storage server device 20, e.g., a Storage Series and XStream servers Linux-based storage servers which are connected to the Ingest Server 20' via standard Gigabit and 10 Gigabit Ethernet connections 51. A fundamental part of creating Universal Media Files of the present invention is controlling how and where files are placed on storage so that they can be presented to various third-party editing and viewing applications the way those applications need to see the files.

As part of controlling the placement of files, the Storage Server software creates "Universal Media Spaces" on the attached storage subsystem where multiple Avid users are able to work together collaboratively as described in applicants commonly-owned U.S. patent application Ser. Nos. 11/403,036 and 12/102,563 the whole contents and disclosures of which is incorporated by reference herein. The difference between a standard EditShare Avid MXF "Media Space" and a "Universal Media Space" is that the Universal Media Space includes the addition of several extra directories and subdirectories for QuickTime Files. For example, in the computing environment as shown in FIG. 3, a typical Avid MXF space will have the following directory structure:

```
/MediaSpaceName
    /user1_MediaSpaceName *
        /Avid MediaFiles
        /MXF
            /1
                files.mxf
            /user2_1     {symlink to user2's "1" directory}
            /user3_1     {symlink to user3's "1" directory}
        /OMFI MediaFiles  {legacy directory required to be present}
    /user2_MediaSpaceName *
        /Avid MediaFiles
        /MXF
            /1
                files.mxf
            /user1_1     {symlink to user1's "1" directory}
            /user3_1     {symlink to user3's "1" directory}
        /OMFI MediaFiles  {legacy directory required to be present}
    /user3_MediaSpaceName *
        /Avid MediaFiles
        /MXF
```

```
        /1
            files.mxf
            /user2__1        {symlink to user2's "1" directory}
            /user3__1        {symlink to user3's "1" directory}
        /OMFI MediaFiles     {legacy directory required to be present}
```

The directories marked * correspond with the "Network Shares" that are exported for corresponding users who are members of each Media Space. It is understood however, that the exact directory and file layouts presented here are provided for illustrative purposes and that there are other possible variations that could achieve the same ends.

An Avid application running on a given workstation must have it's own unique "numbered directories" (i.e., "1" and "2") inside the MXF directory. At the very minimum, all workstations need a "1" directory that is only writable by that workstation. Under normal circumstances, it would be impossible to have multiple "1" subdirectories inside the same MXF directory. However, the Avid MXF Media Space directory structure developed by EditShare (subject of herein incorporated U.S. patent application Ser. No. 12/102,563) gives each user his/her own "numbered subdirectories" while the symlink scheme exposes other workstation's "1" directories (or "2" directories) through links that have names that are prepended with the user account name at the beginning.

In a Universal Space, such as may be created at the storage server depicted in FIG. 3, the following additional directories are added to the directory structure:

```
\QuickTime
\.essence
```

Thus, the FULL directory structure of an EditShare Universal Media Space looks like this:

```
/MediaSpaceName
    /QuickTime **
        QuickTimeRefMovies.mov   {referring to hard links in .essence}
    ./essence
            hard links to various user's MXF files
    /user1__MediaSpaceName
        /Avid MediaFiles
            /MXF
                /1
                    files.mxf
                    /user2__1        {symlink to user2's "1" directory}
                    /user3__1        {symlink to user3's "1" directory}
                /OMFI MediaFiles     {legacy directory required to be present}
                /QuickTime           {symlink to the common QuickTime folder}
    /user2__MediaSpaceName
        /Avid MediaFiles
            /MXF
                /1
                    files.mxf
                    /user1__1        {symlink to user1's "1" directory}
                    /user3__1        {symlink to user3's "1" directory}
                /OMFI MediaFiles     {legacy directory required to be present}
                /QuickTime           {symlink to the common QuickTime folder}
    /user3__MediaSpaceName
        /Avid MediaFiles
            /MXF
                /1
                    files.mxf
                    /user2__1        {symlink to user2's "1" directory}
                    /user3__1        {symlink to user3's "1" directory}
                /OMFI MediaFiles     {legacy directory required to be present}
                /QuickTime           {symlink to the common QuickTime folder}
```

It is important to note that in the computing environment including storage server 20 of FIG. 3, the QuickTime directory is "read only" to all users and thus neither the hard links nor the QuickTime reference files can be deleted, renamed, moved or otherwise changed by ordinary users.

When functioning in the context of Universal Media Files, the ingest server 20 encodes video and audio data streams in the DV25, DV50, DV100 codecs (or other "standards-based codecs") and wraps the encoded data in the Avid MXF OP Atom format—consisting of 1 separate video file and up to 8 separate audio files per "clip". As per the SMPTE specification for MXF files, included in the "headers" of the Avid MXF files is metadata information about the "clip name", "source tape" or "reel", "SMPTE timecode start".

The encoded MXF files are inherently compatible with Avid non-linear editing applications. However "as is" they are not compatible with non-Avid applications.

To make the encoded video and audio data usable with non-Avid applications, without having to replicate the video and audio data, Universal Media File software is employed to produce QuickTime Reference Movies, i.e., the small QuickTime files that contain the same essential metadata as the original Avid MXF files (i.e., "source tape" or "reel" name, SMPTE timecode start, etc) but then point to the "essence" portion of the Avid MXF files.

When Ingest Server completes the capture of a new clip that is to become "Universal", the Ingest Server notifies the Storage server, e.g., via an encrypted http: messaging system, that a set of new Avid MXF files has been created (one video file plus some number of audio files). The notification includes the name of the files and the path where they have been stored.

When receiving this message, Universal Media File software running on the Storage server performs the following functions:

For each new Avid video and audio file, EditShare creates a Linux "hard link" to the file and places it in the same "Media Space" as the new Avid media files, but in a different directory than the original Avid files.

Each new Avid video and audio file is opened and inspected to retrieve metadata information from the file header.

The metadata from the Avid files is used to populate a new QuickTime Reference Movie file that includes information about the "resolution" of the file (i.e., 720×480), the codec used to encode the file (i.e., DV25), the "reel" or "tape name" that was the source of the recording, the beginning time code, the running length of the clip, as well as instructions about how to find the video and audio "essence" (the parts of the Avid audio and video files that include the actual video and audio data streams).

The QuickTime Reference files are made in relationship to the "hard links" rather than the original Avid files. This has several benefits:

In the computing environment depicted in FIG. 3, in order to allow multiple Avid editors to work collaboratively with the same pool of media files, different editors will see the same Avid MXF files in directories that have significantly-different names (i.e., as illustrated above, one user may see files in the "1" directory, and another may see the exact same files in "user2__1"). The differences in directory name do not matter for Avid applications because Avid applications maintain an on-disk database in each directory that describes what files are in that location. However it is virtually impossible to make a single set of QuickTime Reference Movies that can be accessed by multiple different users if the location of the files being referred to are not consistent from user to user.

By creating a single directory where hardlinks are stored for each Avid video and audio file—regardless of the directory name where the original file was stored in—the invention provides a consistent location on which to base QuickTime Reference Movies.

A further benefit of creating hard links is that the hardlinks are "second names" for the original Avid video and audio files. There is still only one copy of the data, but so long as one name or the other has not been deleted from the storage system, the video and audio files will still be accessible. This means that if Avid users delete their name for the media files, the files will not disappear for the QuickTime users—and vice versa.

Figure 9A:
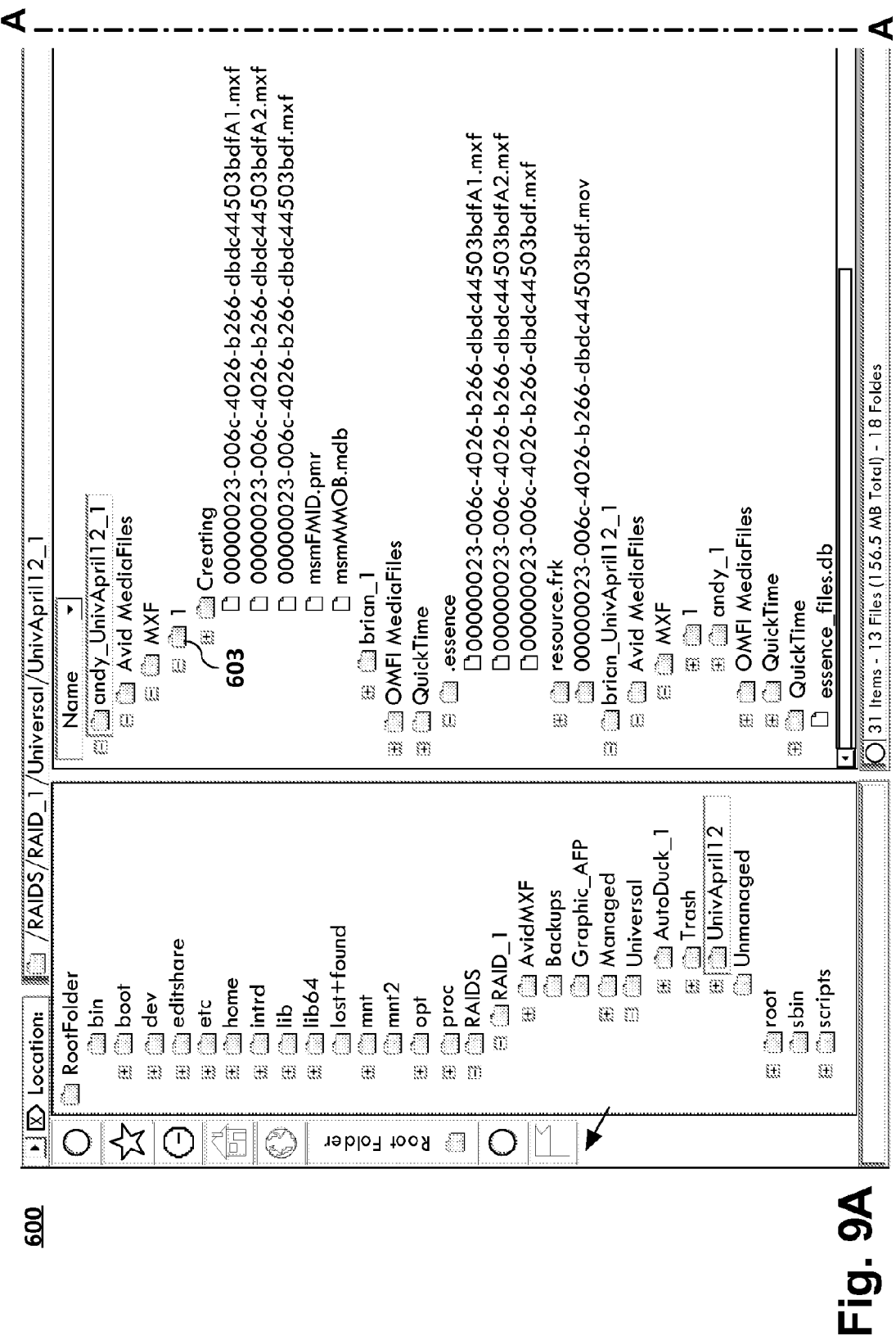

FIGS. 9A and 9B depicts an example directory structure 600 from the point of view of the storage server 20 showing the location of the Avid MXF files, e.g., in the directory location 603 (andy_Univ12_1/Avid MediaFiles/MXF/1).

As shown in FIG. 4, with respect to the workstations 30a, 30b, . . . , 30n which would be connected to the centralized shared storage systems for collaborative non-linear editing and manipulation of digital video and audio files, each comprises a computer system 200, including one or more processors or processing units 110, a system memory 250, and a bus 101 that connects various system components together. For instance, the bus 101 connects the processor 110 to the system memory 250. The bus 101 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 200 includes one or more monitors 19 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 200 additionally includes: computer readable media, including a variety of types of volatile and non-volatile media, each of which can be removable or non-removable. For example, system memory 250 includes computer readable media in the form of volatile memory, such as random access memory (RAM), and non-volatile memory, such as read only memory (ROM). The ROM may include an input/output system (BIOS) that contains the basic routines that help to transfer information between elements within computer device 200, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 101 by one or more data media interfaces (not shown). Alternatively, the hard disk drive, magnetic disk drive, and optical disk drive can be connected to the system bus 101 by a SCSI interface (not shown), or other coupling mechanism. Although not shown, the computer 200 can include other types of computer readable media. Generally, the above-identified computer readable media provide non-volatile storage of computer readable instructions, data structures, program modules, and other data for use by computer 200. For instance, the readable media can store an operating system (O/S), one or more application programs, such as video editing client software applications, and/or other program modules and program data for enabling video editing operations via Graphical User Interface (GUI).

Input/output interfaces 145 are provided that couple the input devices to the processing unit 110. More generally, input devices can be coupled to the computer 200 through any kind of interface and bus structures, such as a parallel port, serial port, universal serial bus (USB) port, etc. The computer environment 100 also includes the display device 19 and a video adapter card 135 that couples the display device 19 to the bus 101. In addition to the display device 19, the computer environment 200 can include other output peripheral devices, such as speakers (not shown), a printer, etc. I/O interfaces 145 are used to couple these other output devices to the computer 200.

As mentioned, computer system 200 is adapted to operate in a networked environment using logical connections to one or more computers, such as the server device 20 that may include all of the features discussed above with respect to computer device 200, or some subset thereof. It is understood that any type of network can be used to couple the computer system 200 with server device 20, such as a local area network (LAN), or a wide area network (WAN) 99a (such as the Internet). When implemented in a LAN networking environment, the computer 200 connects to local network 99a via a network interface or adapter 29 that support the above-mentioned Gigabit over Copper Ethernet as well as Jumbo Frames. When implemented in a WAN networking environment, the computer 200 connects to the WAN 300 via a high speed cable/dsl modem 180 or some other connection means. The cable/dsl modem 180 can be located internal or external to computer 200, and can be connected to the bus 101 via the I/O interfaces 145 or other appropriate coupling mechanism. Although not illustrated, the computing environment 200 can provide wireless communication functionality for connecting computer 200 with remote computing device, e.g., an application server 20 (e.g., via modulated radio signals, modulated infrared signals, etc.).

In the networked environment, it is understood that the computer system 200 can draw from program modules stored in a remote memory storage devices (not shown) in a distributed configuration. However, wherever physically stored, one or more of the application programs executing the non-linear video editing system of the invention can include various modules for performing principal tasks. For instance, the application program can provide logic enabling input of video source data for storage as media files in the centralized data storage system and/or performing the video editing techniques thereon. Other program modules can be used to implement additional functionality not specifically identified here.

It should be understood that other kinds of computer and network architectures are contemplated. For example, although not shown, the computer system 200 can include hand-held or laptop devices, set top boxes, programmable consumer electronics, playout servers, video encoders, video recorders that play from and record to devices such as hard drives, mainframe computers, etc. However, it is understood that the computing environment 200 can employ a distributed processing configuration. In a distributed computing environment, computing resources can be physically dispersed.

Figure 5:
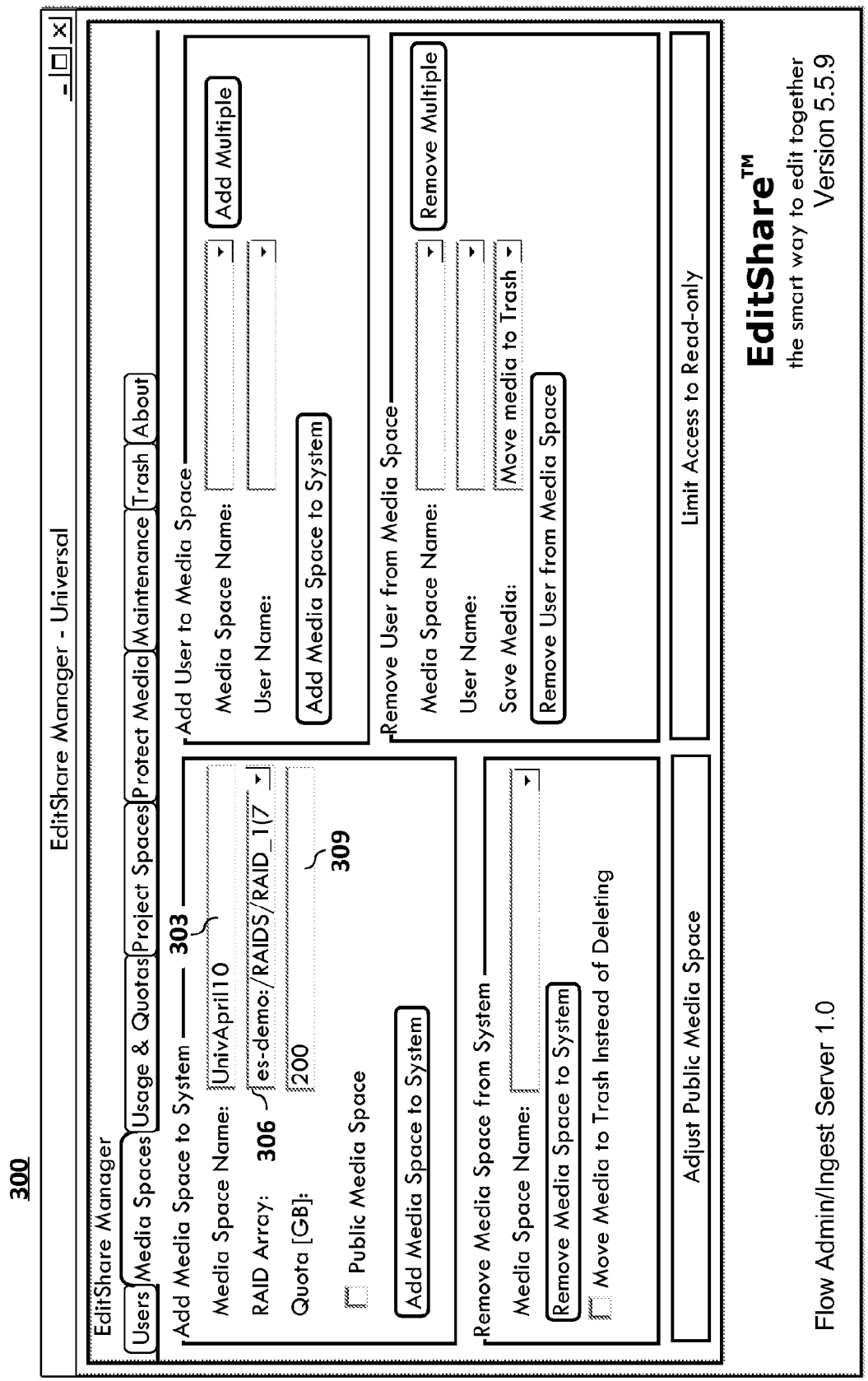
FIG. 5 depicts an example graphic user interface (GUI) 300 via which one can create a new Media Space (virtual volume) having Universal Media Files in accordance with one embodiment of the invention.

As shown in FIG. 5, there is depicted an example graphic user interface (GUI) 300 as generated by the computing system of FIG. 3 and particularly depicts a Manager GUI, via which one can create a new Media Space (virtual volume) that has the directory structure of a typical "Avid MXF Media Space" plus the addition of the extra "QuickTime" directories and the ".essence" subdirectory of the QuickTime directory. The process of creating the directory structure is fully automated. An authorized user, such as an administrator, provides as input, a name for the Media Space via entry field 303, select what filesystem to put the Media Space on via entry field 306 (e.g., RAID_1 array), and select a size via entry field 309 to make the virtual volume and then the Manager software creates the directory structure within the new space.

Figure 6:
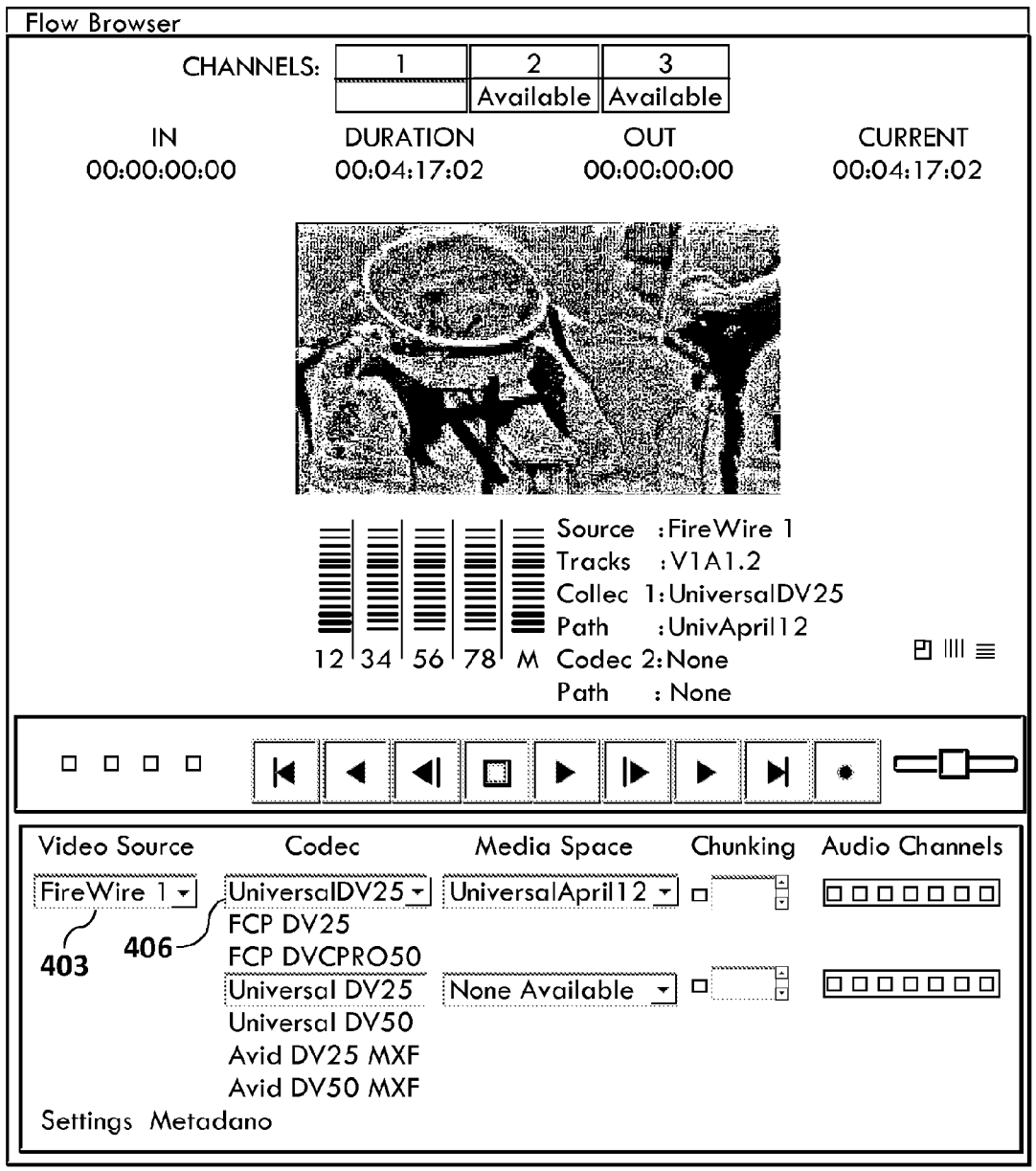
FIG. 6 depicts an example GUI 400 provided at the Ingest Server that allows a user to perform an ingest operation "ingesting" one or more "Universal Media File" formats.

As shown in FIG. 6, there is depicted an example GUI 400 provided at the Ingest Server that allows a user to perform an ingest operation at an ingest server (server 20' of FIG. 3), e.g., by "ingesting" one or more "Universal Media File" formats. An authorized user selects via drop-down box 403 a video source. Via drop-down box 406 a user is enabled to select a codec in which the digital media file or clip is to be wrapped. When selecting Universal DV25, for instance, an application executing at the ingest server, will encode video and audio in the Avid MXF DV25 format. When a clip has finished capturing, the Ingest Server will signal the Storage Server (server 20 of FIG. 3) to "make the files Universal", meaning that Storage Server will 1) make hard links to the new Avid files and 2) create QuickTime Reference Movies that reference those hard links as described herein.

Figure 7A:
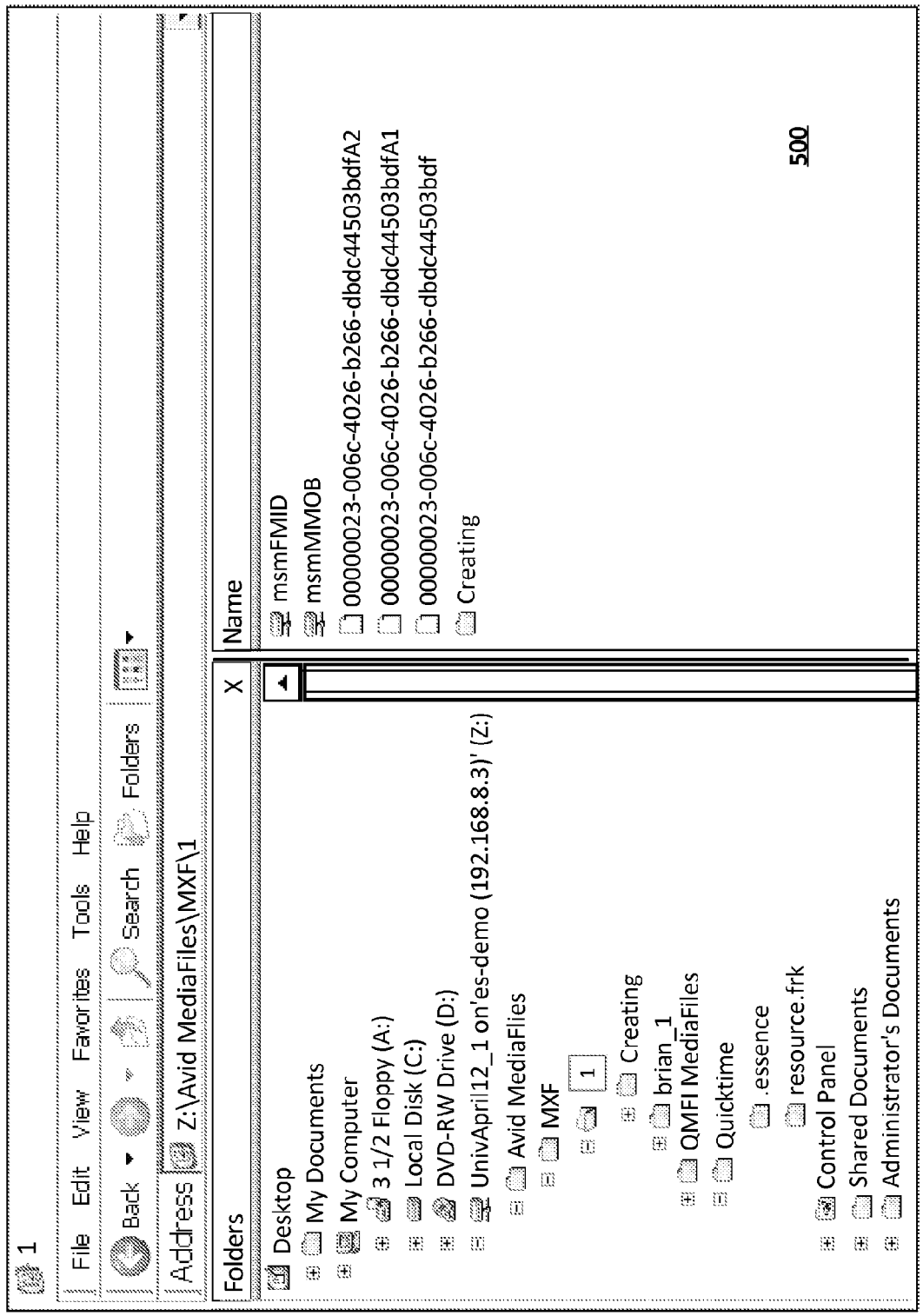
FIG. 7A depicts an example directory structure 500 resulting when ingesting in a Universal Media File format, and the placement of Avid media files into a normal Avid directory

As shown in FIG. 7A, there is depicted an example directory structure 500 resulting when ingesting in a Universal Media File format, the Avid media files are placed into a normal Avid directory—for example, in "//UnivApril12_1/Avid MediaFiles/MXF/1"

Figure 7B:
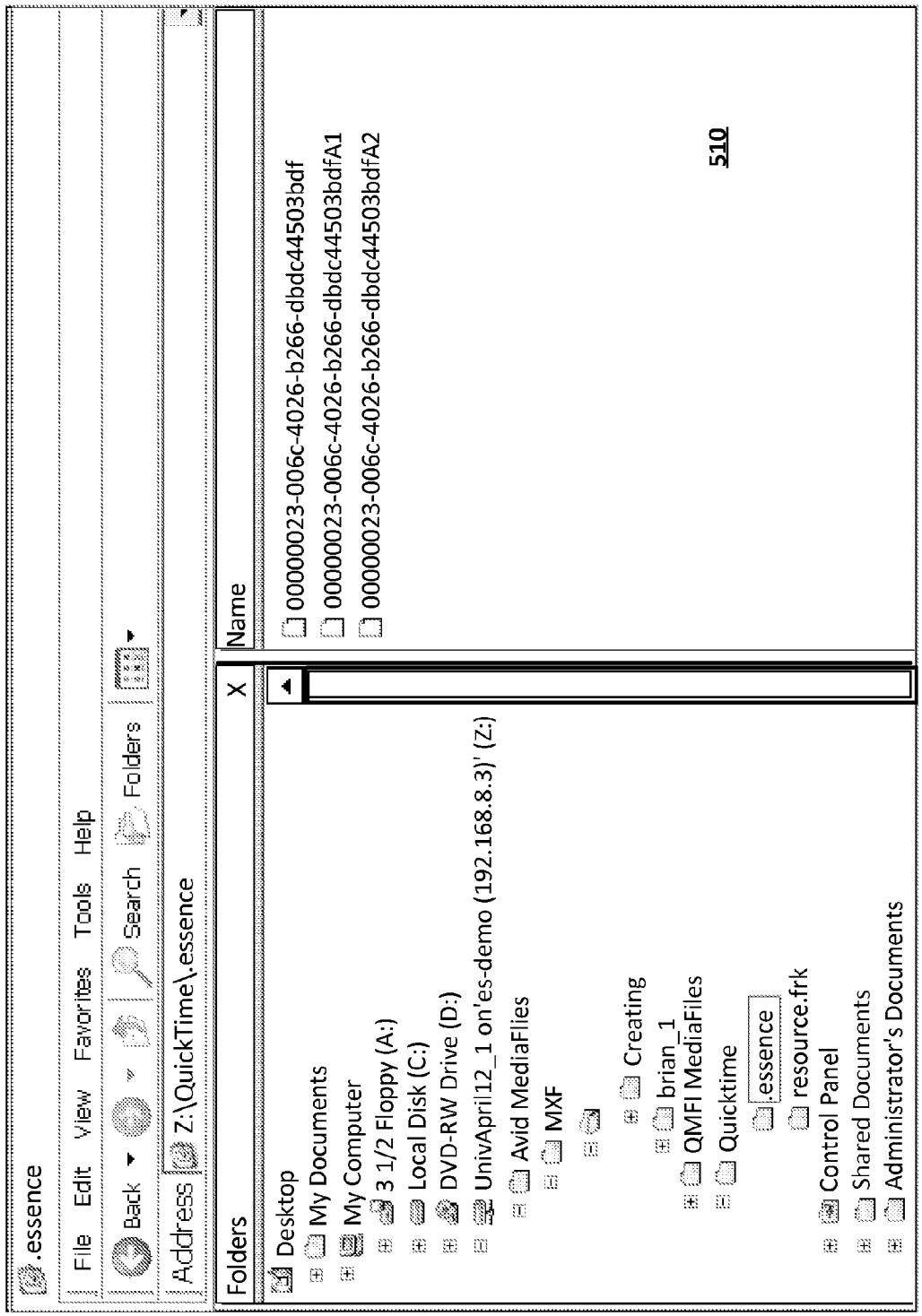
FIG. 7B depicts an example directory structure 510 showing that when the ingest of a clip has been completed, the system creates "hard links" to the Avid MXF files and saves them in the same "Media Space", but in a different directory.

As shown in FIG. 7B, there is depicted an example directory structure 510 showing that when the ingest of a clip has been completed, the software Manager—upon getting a signal from Flow Ingest server—automatically creates "hard links" to the Avid MXF files and saves them in the same "Media Space", but in a different directory, in this example in "//UnivApril12_1/QuickTime/.essence/".

Figure 7C:
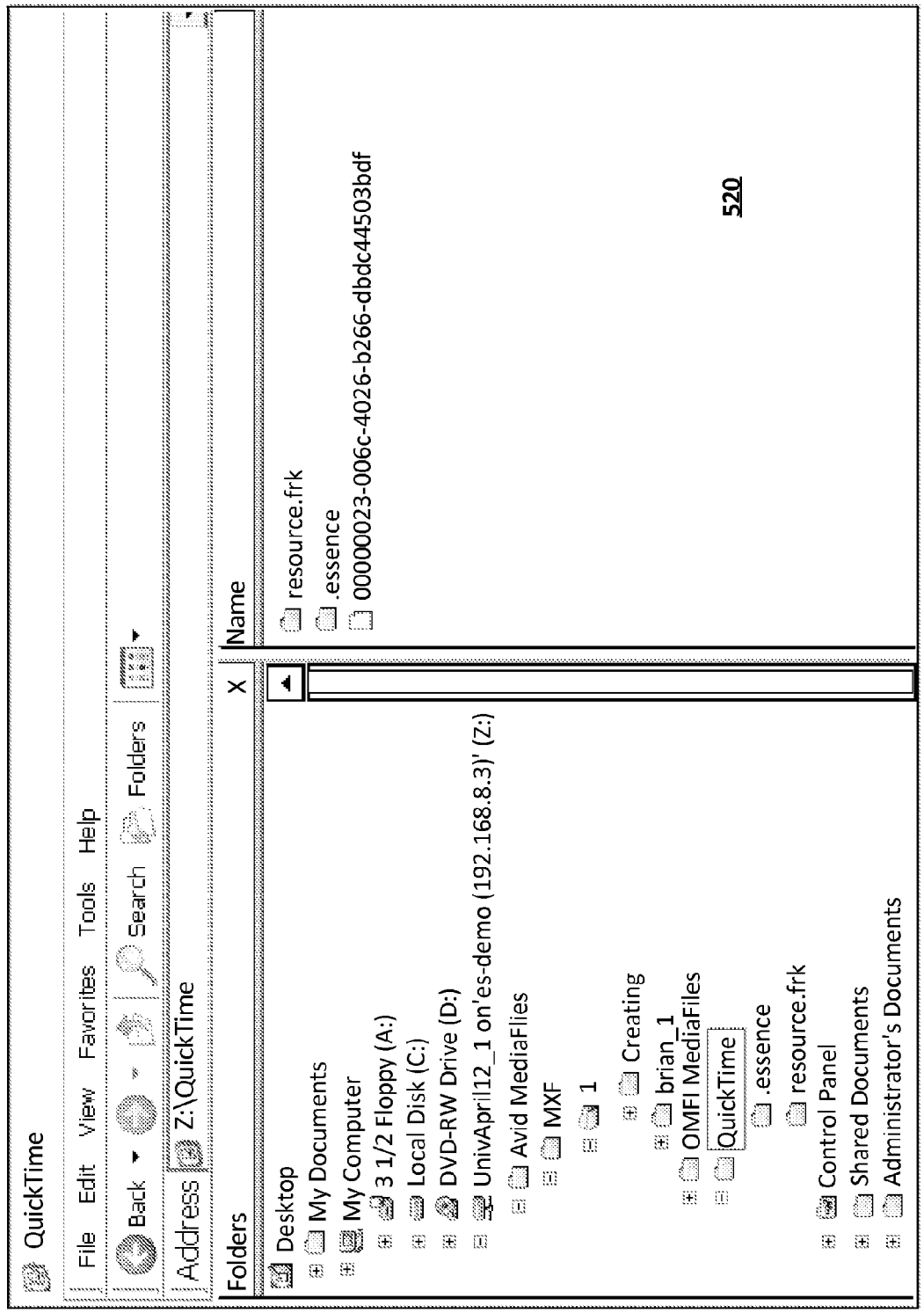
FIG. 7C depicts an example directory structure 520 showing how once the "hard links" have been made, the system extracts metadata from the new files and writes the data into Quick Time Reference Movies that reference the "hard links"

As shown in FIG. 7C, there is depicted an example directory structure 510 showing how, once the hard links have been made, the manager software executes code that automatically extracts metadata from the new files and writes the data into QuickTime Reference Movies that reference the "hard links". In this example, the QuickTime Reference files are located in "//UnivApril12_1/QuickTime/".

Figure 8:
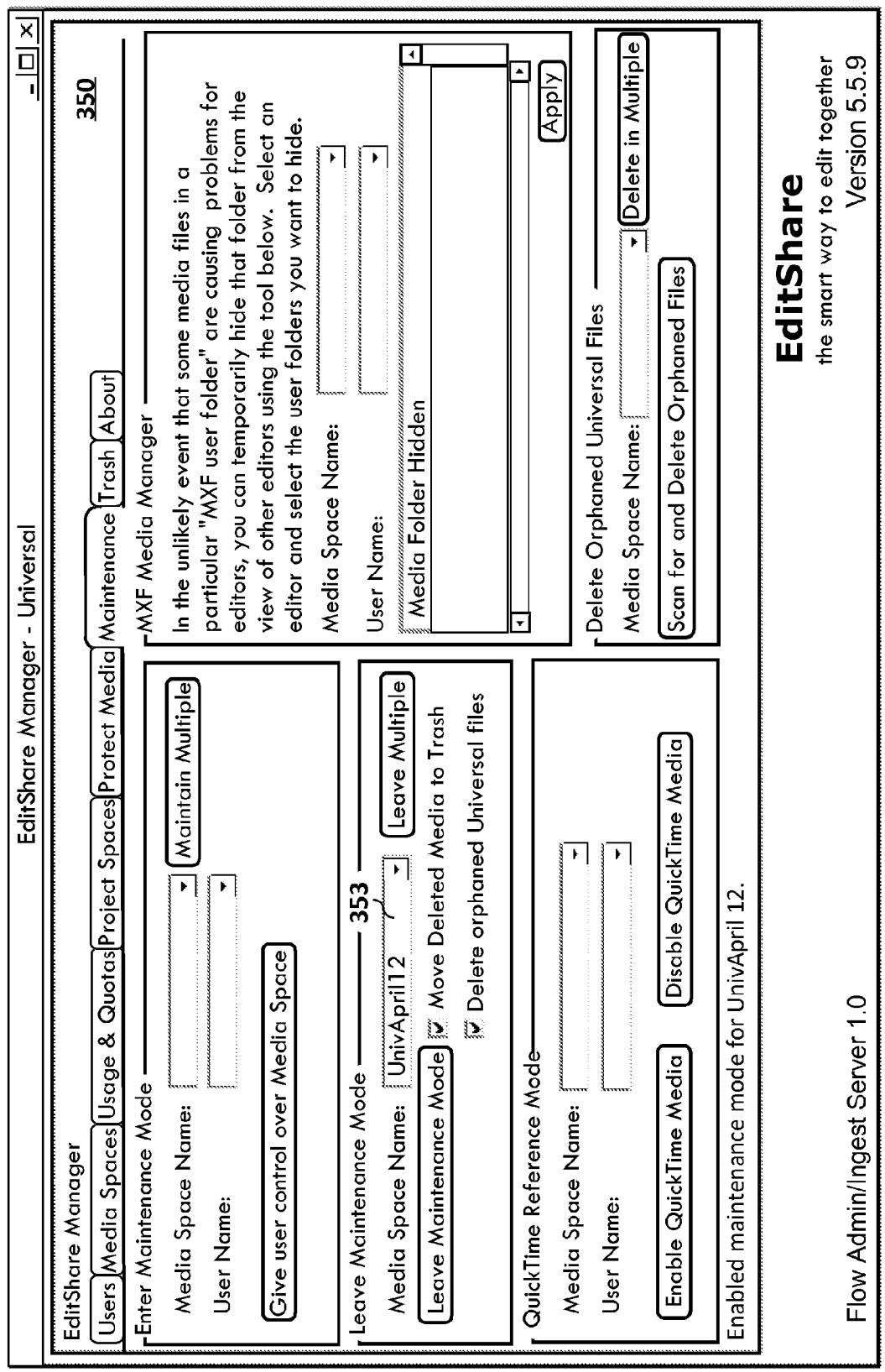
FIG. 8 depicts an example generated graphic user interface (GUI) 350 providing functionality initiated for deleting the corresponding hardlinks and QuickTime Reference Movies to "clean up" the Media Space of the media space name; and, FIGS. 9A and 9B depicts an example directory structure from the point of view of the storage server showing the location of the Avid MXF files (in the directory andy_Univ12_1/Avid MediaFiles/MXF/1)

As shown in FIG. 8, there is depicted an example graphic user interface (GUI) 350 as generated by the computing system of FIG. 3 and particularly depicts how the system anticipates situations in which Avid users may have deleted the files (and file names) located in the Avid MXF storage place, and how an administrator, via functionality initiated via selecting a maintenance tab, can automatically delete the corresponding hardlinks and QuickTime Reference Movies to "clean up" the Media Space of the media space name specified via drop down box 353. It is possible for Avid users to delete MXF files, but to leave alone the hard links and QuickTime Reference Movies—in which case the ingested clips that were deleted will no longer be visible to Avid users but will still be visible to QuickTime users.

It should be understood that, according to the invention, it is possible to create Universal Media Files (i.e., QuickTime Reference Movies) from clips that were not ingested through Flow application of the ingest server. For example, it would be possible for the present invention to scan through all user's Avid files and make hard links (and corresponding QuickTime Reference Movies) for any clips that were not already "Universal". Ingesting through the Ingest Server allows a user to specify up front that the files be "Universal".

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described my invention, what I claim as new, and desire to secure by Letters Patent is:

1. A computer system for automatically creating a universal reference file in an operating system that supports hard links, the system comprising:
   a memory and a processor in communication with the memory;
   a pre-determined hierarchy of a directory structure storing one or more digital media files having multi-media content, the one or more digital media files being wrapped using a proprietary encoder;
   an automatically created first folder in the pre-determined hierarchy of the directory structure storing, using the memory, the universal reference file associated with the one or more digital media files;
   one or more automatically created hard links, referring to each of the one or more digital media files;
   an automatically created second folder in the pre-determined hierarchy of the directory structure storing, using the memory, the one or more hard links;
   the universal reference file containing embedded information, the embedded information including an automatically obtained location of each of the one or more hard links and source name and time code information associated with the multi-media content;
   wherein the universal reference file refers to the one or more hard links and is labeled as being created by a native encoder and not labeled as being created by the proprietary encoder, enabling applications that are not compatible the one or more digital media files wrapped in the proprietary encoder format to access the multi-media content of the one or more digital media files using the universal reference file readable by the native encoder; and
   wherein deleting the one or more digital media files does not affect the functionality of the one or more hard links, enabling access to the multi-media content of the one or more digital files even after the one or more digital media files are deleted.

2. The system of claim 1, wherein the embedded information further comprises one or more of the following: "source tape" information, "clip name" information, "reel name" information, "timecode start" information, "resolution" information, information about the codec that was used to encode the media file, and/or information about where the multi-media content begins in the media file.

3. The system of claim 1, further comprising an automatically generated graphical user interface enables, using the processor, a user to create a new universal reference file.

4. The system of claim 1, further comprising a notification containing the location of the one or more digital media files.

5. A method, implemented by a processor in communication with a memory, for creating a universal reference file in an operating system that supports hard links, the method comprising:
   in response to receiving a request to create the universal reference files:
      automatically creating, at a pre-determined hierarchy of a directory structure, a first folder for storing universal reference files associated with one or more digital media files, the one or more digital media files having multi-media content and being wrapped using a proprietary encoder;

automatically obtaining a location of each of the one or more digital media files;

automatically creating one or more hard links to each of the one or more digital media files;

automatically creating, at the pre-determined hierarchy of the directory structure, a second folder and placing the one or more hard links in the second folder;

automatically traversing the one or more digital media files to obtain additional information from the one or more digital media files;

automatically creating the universal reference file and placing the universal reference file in the first folder; and automatically embedding the obtained location and the additional information in the universal reference file;

wherein the obtained location embedded in the universal reference file refers to the one or more hard links;

wherein the additional information comprises source name and time code information associated with the multi-media content;

wherein the universal reference file is labeled as being created by a native encoder and not labeled as being created by the proprietary encoder, enabling applications that are not compatible with the wrapped format of the one or more digital media files to access the multi-media content of the one or more digital media files; and wherein deleting the one or more digital media files does not affect the functionality of the one or more hard links, enabling access to the multi-media content of the one or more digital media files even after the one or more digital media files are deleted.

6. The method of claim 5, wherein the additional information comprises one or more of the following: "source tape" information, "clip name" information, "reel name" information, "timecode start" information, "resolution" information, information about the codec that was used to encode the media file, and/or information about where the multi-media content begins in the media file.

7. The method of claim 5, further comprising, prior to the step of automatically obtaining the location, the step of wrapping the one or more digital media files using the proprietary encoder and storing the one or more digital media files in the memory.

8. The method of claim 5, further comprising, prior to the step of automatically creating the first folder: automatically generating a graphical user interface that enables a user to instruct the system to create a new universal reference file; and receiving a request from the user to create the-anew universal reference file.

9. The method of claim 5, wherein obtaining the location comprises searching for a location or receiving a notification containing a location.

10. A non-transitory computer-readable storage medium with an executable program stored thereon, wherein the program contains instructions for implementation by a computer to perform the following steps:

in response to receiving a request to create a universal reference file:

automatically creating, at a pre-determined hierarchy of a directory structure, a first folder for storing universal reference files associated with one or more digital media files, the one or more digital media files having multi-media content and being wrapped using a proprietary encoder;

automatically obtaining a location of each of the one or more digital media files;

automatically creating one or more hard links to each of the one or more digital media tiles;

automatically creating, at the pre-determined hierarchy of the directory structure, a second folder and placing the one or more hard links in the second folder automatically traversing the one or more digital media files to obtain additional information from the one or more digital media files;

automatically creating the universal reference file and placing the universal reference file in the first folder; and automatically embedding the obtained location and the additional information in the universal reference file;

wherein the obtained location embedded in the universal reference file refers to the one or more hard links;

wherein the additional information comprises source name and time code information associated with the multi-media content;

wherein the universal reference is labeled as being created by a native encoder and not labeled as being created by the proprietary encoder, enabling applications that are not compatible with the wrapped format of the one or more digital media files to access the multi-media content of the one or more digital media files; and wherein deleting the one or more digital media files does not affect the functionality of the one or more hard links, enabling access to the multi-media content of the one or more digital media files even after the one or more digital media files are deleted.

11. The computer-readable storage medium of claim 10, wherein the universal reference file refers to the one or more digital media files using the one or more hard links.

12. The computer-readable storage medium of claim 10, wherein the additional information comprises one or more of the following: "source tape" information, "clip name" information, "reel name" information, "timecode start" information, "resolution" information, information about the codec that was used to encode the media file, and information about where the multi-media content begins in the media file.

13. The computer-readable storage medium of claim 10, wherein the method further comprises, prior to the step of automatically obtaining the location, the step of wrapping the one or more digital media files using the proprietary encoder and storing the one or more digital media files in the memory.

14. The computer-readable storage medium of claim 10, wherein the method further comprises, prior to the step of automatically creating the first folder: automatically generating a graphical user interface that enables a user to instruct the system to create a new universal reference file; and receiving a request from the user to create a new universal reference file.

* * * * *